Oct. 2, 1962 — A. J. WHITE — 3,056,380
BRAKE LINING
Filed Jan. 16, 1961
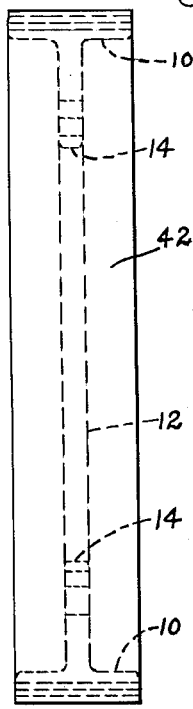
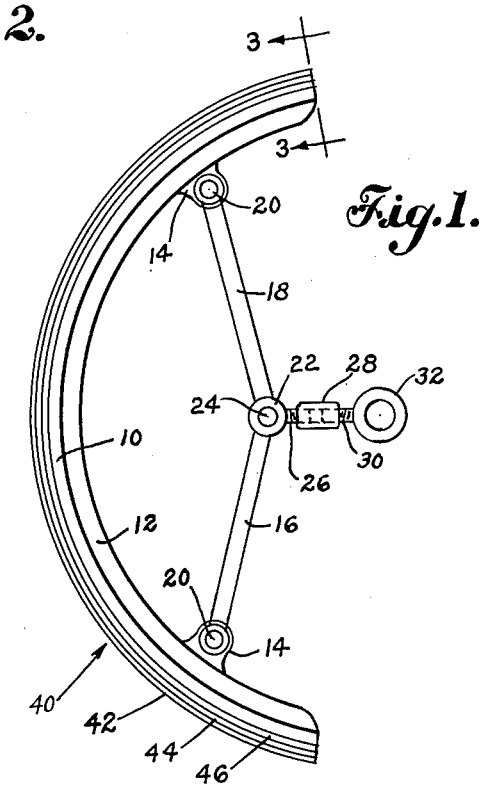
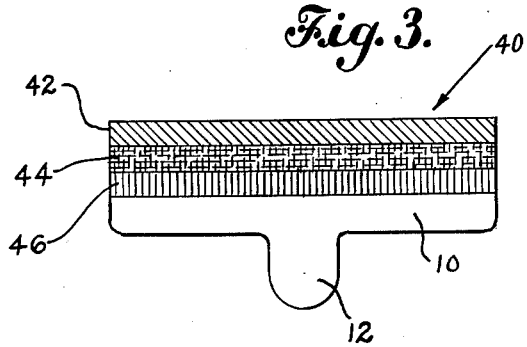
INVENTOR.
Andrew J. White
BY Harold E. Cole
Attorney United States Patent Office 3,056,380
Patented Oct. 2, 1962

3,056,380
BRAKE LINING
Andrew J. White, Lee, N.H.
(Newmarket P.O., South Lee, N.H.)
Filed Jan. 16, 1961, Ser. No. 82,767
3 Claims. (Cl. 116—114)

This invention relates to a brake lining for vehicles such as automobiles.

One problem in the installation and servicing of brakes on automobiles is to determine when a brake lining should be replaced, or if it should be adjusted and if so then the problem is to determine what the adjustment on the brake lining should be. Furthermore, the laws in many states require that a lining shall be replaced when it becomes less than 60% of its original thickness, yet it has been difficult to determine what the thickness of the worn lining is.

Accordingly, my principal object is to provide a laminated brake lining, whether molded or woven, that will enable a service man to determine; by visual observation, exactly what the thickness of the lining is that is attached to the braking mechanism of a vehicle wheel. Thus he can adjust the brake lining to the extent required, and also adjust it evenly so that contact of the lining with the shoe will be total. To accomplish this I give each brake lining lamination a distinctive color, one being green, another yellow and another red, for instance. Other colors could be used, and more laminations and colors also, depending upon the needs.

A further object is to color one or more of the laminations with material that is sensitive to temperature and will change color when the lamination reaches a temperature that results in diminution of the effectiveness of the brake lining. This change of color enables a service man to determine by mere visual examination if the brake lining has suffered a loss of effectiveness due to overheating.

The foregoing and other objects, which will appear as the nature of the invention is better understood, may be accomplished by a construction, combination and arrangement of parts such as is disclosed by the drawing. The nature of the invention is such as to render it susceptible to various changes and modifications, and, therefore, I am not to be limited to the construction disclosed by the drawing nor to the particular parts described in the specification; but am entitled to all such changes therefrom as fall within the scope of my claims.

FIG. 1 is a side elevational view of brake apparatus for a vehicle showing my lining attached thereto in position of use.

FIG. 2 is a front elevational view thereof.

FIG. 3 is an enlarged, sectional view taken on the line 3—3 of FIG. 1.

As illustrated, I show one form of brake apparatus, having a brake shoe 10 that has a bead 12 and lugs 14 thereon. Other forms of brake apparatus are suitable. Extending from said lugs 14 are expansion levers 16 and 18 which are pivotally connected as at 20 to said lugs 14. Said expansion levers 16 and 18 are connected to a connector 22 by a pin 24. Said connector 22 has a screw-threaded portion 26 on which a portion of a turnbuckle 28 is screw-threadedly mounted. Also screw-threadedly connecting with said turnbuckle is a screw-threaded portion 30 extending from a boss 32 of a well-known brake drum not shown. Attached to said brake shoe 10 I have shown a lining 40 having an outer laminated portion 42 shown as green, another lamination 44 shown as yellow and an inner lamination 46 shown as red.

To determine the condition of a brake lining a service man needs merely remove a wheel that includes my brake lining, and examine the colored laminations. If the outer lamination 42, (shown as green) is still visible, although worn, he knows the brake lining has considerable wear left. If he can see yellow, but no red, it is still useful. However, if red is visible anywhere then he knows that the brake lining must be replaced.

If the service man notices that the toe is worn down to the yellow lining 44 and the heel still shows green, this tells him that the brake lining is out of adjustment, hence proper adjustment is made to make total contact of the brake lining with the shoe.

One or more of said laminations 42, 44 and 46 may have a color incorporated therein that will change color at a predetermined temperature such as 350 degrees F. For instance, a red lamination may turn brown, and the higher the temperature the darker it becomes. This is a tell-tale signal, that informs a service man that the brake lining has been subjected to a temperature so high that said lining has lost an important part of its effectiveness hence should be replaced or other notice taken of it. A brake lining, or a lamination thereof, may be made sensitive to heat by changing color, that has incorporated therein Lea's salts or a formula $Ag_2Hg CL_2I_2$. Heat that causes a plastic flow of the brake lining will cause change of color in this event. If the lining is red, or other bright color, for instance, the change of color so caused will be very noticeable.

What I claim is:

1. A brake lining comprising three laminations of substantially equal thickness and of distinguishing characteristics, said lining being attached directly to a brake shoe, whereby wear on the lining may be readily determined by noting the thickness of layers that may remain.

2. A brake lining as set forth in claim 1 in which the distinguishing characteristics comprise a different color for each said lamination.

3. A brake lining as set forth in claim 2 in which the colors are green, yellow and red.

References Cited in the file of this patent
UNITED STATES PATENTS
2,644,551     Glazebrook _____ July 7, 1953
FOREIGN PATENTS
448,223     Great Britain _____ June 4, 1936